United States Patent [19]

Shaw et al.

[11] Patent Number: 4,748,788
[45] Date of Patent: Jun. 7, 1988

[54] SURFACE SEEDED EXPOSED AGGREGATE CONCRETE AND METHOD OF PRODUCING SAME

[76] Inventors: Ronald D. Shaw, 1988 Pelican, Costa Mesa, Calif. 92626; Lee A. Shaw, 1924 Irvine Ave., Newport Beach, Calif. 92660; LeRoy E. Shaw, 2861 Tabago, Costa Mesa, Calif. 92626

[21] Appl. No.: 69,385

[22] Filed: Jul. 1, 1987

[51] Int. Cl.[4] ............................................. E04B 1/00
[52] U.S. Cl. ........................................ 52/742; 52/315; 264/31; 264/333
[58] Field of Search ..................... 52/741, 742, 315; 264/31, 82, 256, 333, DIG. 43

[56] References Cited

U.S. PATENT DOCUMENTS

| | | | |
|---|---|---|---|
| 1,728,936 | 9/1929 | Johnson | 52/741 X |
| 2,275,272 | 3/1942 | Scripture, Jr. | 264/31 X |
| 2,277,203 | 3/1942 | Boult | 264/31 |
| 2,296,453 | 9/1942 | Saffert | 32/315 X |
| 4,115,976 | 9/1978 | Rohrer | 52/741 |
| 4,146,599 | 3/1979 | Lanzetta | 52/315 X |
| 4,281,496 | 8/1981 | Danielsson | 264/31 X |
| 4,496,504 | 1/1985 | Steenson et al. | 264/333 X |

Primary Examiner—Henry E. Raduazo
Assistant Examiner—Creighton Smith
Attorney, Agent, or Firm—Stetina and Brunda

[57] ABSTRACT

An improved surface seeded exposed aggregate concrete and method of use is disclosed characterized by use of small, rounded aggregate, preferably sand, being broadcast over the upper surface of the concrete. The broadcast aggregate is mixed into the cement paste derived from the concrete matrix by magnesium hand floats and finished by hand sponging. A surface retarder and vapor barrier is than applied to cover the concrete surface for approximately four to twenty four hours. Subsequently, any surface film is washed from the surface of the concrete and the concrete is cured by fogging or soaker hose. Approximately thirty days later, the surface residue is removed from the concrete with a stem/acid wash providing an exposed aggregate concrete having extreme flatness and high wear resistance suitable for high traffic areas and improved asthetics resembling stone, granite or marble.

19 Claims, 1 Drawing Sheet

U.S. Patent   Jun. 7, 1988   4,748,788
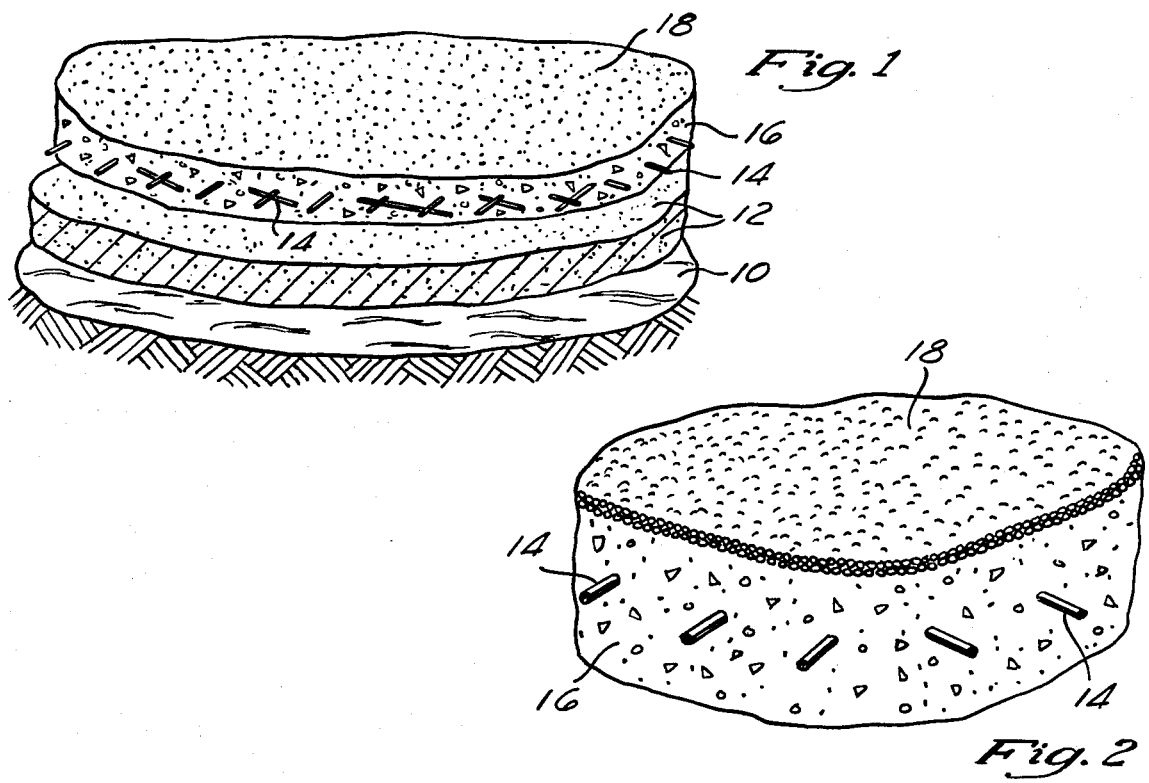
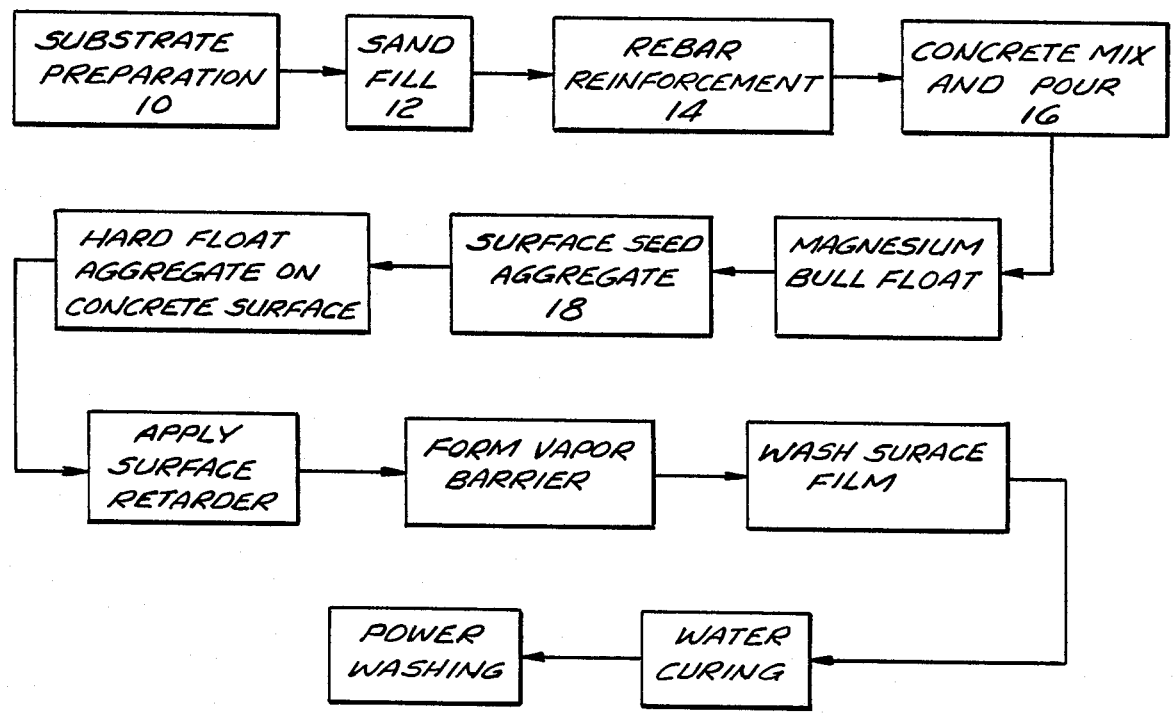

SURFACE SEEDED EXPOSED AGGREGATE CONCRETE AND METHOD OF PRODUCING SAME

FIELD OF THE INVENTION

The present invention relates to exposed aggregate concrete and, more particularly, to an improved surface seeded exposed aggregate concrete and method of producing the same.

BACKGROUND

As is well known, concrete has been extensively utilized as a building material for industrial, commercial and residential applications. Due to its durability, wear resistance and cost economy, concrete is currently gaining widespread use in flooring applications. With this widespread use, the public is currently demanding variations in color and surface texture of concrete such that the concrete possesses improved asthetics similar to more conventional and costly flooring surfaces such as marble, stone and granite.

To meet this demand the concrete trade has heretofore developed various coloring and surface finishing techniques to enhance the asthetics of the concrete. Examples of such finishing techniques comprise salt finish, multiple broom finish, form press finish, and exposed aggregate finish.

With specific relation to exposed aggregate finishes, basically two production methods are currently being utilized, i.e. integrally exposed aggregate and surface seeded exposed aggregate. The more conventional of these two, i.e. the integrally exposed aggregate, comprises the washing or removal of the surface cement and fines from the concrete while the concrete surface is still plastic, i.e. before full curing, such that the aggregate, normally rock or gravel, is left exposed on the surface of the concrete. Due to the normal size of such concrete aggregate being relatively large, i.e. approximately one-half to one inch in mean diameter, as well as the washing process not being uniform in nature, the resultant concrete surface derived by the integrally exposed aggregate method is extremely rough and jagged, thereby limiting its widespread use in flooring applications.

More recently, surface seeded exposed aggregate has been introduced which, subsequent to the pouring of the concrete, rock or gravel aggregate is broadcasted, i.e. seeded, over the top surface of the concrete and subsequently troweled into the same wherein upon curing the aggregate broadcast over the surface adheres to the surface and is thus exposed. Although various size aggregate can be broadcast over the surface of the concrete in the surface seeded exposed aggregate technique, normally such aggregate is approximately three-eighths inch diameter mean size or greater, having sheared or jagged edges such that the same can be worked into the surface of the concrete and be adequately adhered thereto. Thus, the resultant concrete surface, although being flater and not possessing as many surface irregularities as the integrally exposed aggregate surface, still possesses an extremely rough surface which limits its widespread use in flooring applications.

In recognizing this deficiency, attempts have been made to reduce the size of the aggregate exposed on the surface of the concrete. However, such proposed solutions have typically failed due to the inability in adhering such smaller aggregate to the concrete surface. In this regard, as the aggregate size diminishes, it has heretofore been difficult, if not impossible, in insure that the aggregate will be adequately maintained upon the surface of the concrete for prolonged duration and with substantial uniformity.

Thus, there exists a substantial need in the art for an improved exposed aggregate concrete finishing technique which maintains sufficient flatness and possesses minimal surface roughness so as to be suitable for pedestrian hihg traffic flooring applications.

SUMMARY OF THE PRESENT INVENTION

The present invention specifically addresses and alleviates the above-referenced deficiencies associated in the prior art. More particularly, the present invention comprises an improved surface seeded exposed aggregate concrete and method of producing the same which is utilizes small, rounded aggregate, preferably sand such as Monterey Aquarium (Grade) course sand, characterized by having an average mean diameter of approximately one-eighth of an inch and a rounded exterior which is permanently adhered to the surface of the concrete to provide a flat, smooth textured concrete surface. The resultant surface is extremely suitable for pedestrian high traffic flooring applications and may be produced in varying colors to closely resemble or assimilate the asthetics of stone, granite or marble.

In the preferred embodiment the small, rounded aggregate is preferably broadcast over the upper surface of the concrete and is mixed into the cement/paste derived from the concrete matrix by magnesium hand floats and finished by hand sponging. A surface retarded and vapor barrier is then applied to cover the concrete surface for approximately four to twenty four hours. Subsequently any surface film is washed away from the surface of the concrete and the concrete is cured by fogging or with a soaker hose. Approximately thirty days later, surface residues are removed with a steam/acid wash providing an exposed aggregate concrete surface having extreme flatness and high wear resistance suitable for high traffic areas. If desired, the resultant concrete surface can be subsequently saw cut or, alternatively, may be produced via dry joints to closely assimilate the appearance of more conventional flooring surfaces such as stone, granite or marble.

The methodology utilized for producing the surface seeded exposed aggregate concrete of the present invention is specifically designed to insure a proper and complete adherence or bonding of the relatively small sized aggregate upon the surface of the concrete which heretofore has proven difficult and clearly departs from the teaching of the prior art. More particularly, through specific manipulative steps, the present invention insures that the proper amount of cement/fines obtained from the concrete matrix are exposed upon the top surface of the concrete which when mixed with the aggregate broadcast over the surface, insures a proper bond of the same to the concrete surface. The resultant exposed aggregate concrete surface thereby provides surface asthetics and wear resistance similar to granite, marble and/or stone at substantial economic savings.

DESCRIPTION OF THE DRAWINGS

These as well as other features of the present invention will become more apparent upon reference to the drawings wherein:

FIG. 1 is a partial perspective cross-sectional view of the surface seeded exposed aggregate concrete of the present invention;

FIG. 2 is an enlarged partial perspective view of the concrete mixture having the exposed aggregate thereon; and FIG. 3 is a schematic flow diagram of the manipulative steps utilized in producing the surface seeded exposed aggregate concrete of the present invention.

DETAILED DESCRIPTION OF THE PREFERRED EMBODIMENT

Referring to FIGS. 1 through 3, the surface seeded exposed aggregate concrete and method of producing the same is pictorially and schematically illustrated. As is conventional, the initial step in the method of the present invention comprises the preparation of the subgrade to desired elevation and grade and to compact the same to preferably ninety percent compaction. Subsequently, the subgrade 10 is covered with a layer of clean, moist fill sand 12 which preferably is maintained at a minimum four inch layer thickness. Although the fill sand 12 is not absolutely necessary for the method of producing the surface seeded aggregate concrete of the present invention, it is highly desirable to control the hydration process of the concrete. In order to increase the resultant strength of the concrete and reduce subsequent cracking of the same, reinforcement wire mesh or rebar 14 is positioned upon the sand filled bed 12.

With the reinforcement 14 in place, a concrete mix or mixture 16 is poured over the sand and rebar reinforcement 12 and 14 respectively, and as is conventional, is poured to approximately a three and one-half to four inch thickness. Although variations in the concrete mix are clearly contemplated, preferably the concrete mix comprises seventy percent sand and thirty percent three-eighth inch mean diameter aggregate combined with six sack cement (2,000 pounds per square inch) or seven sace cement (3,000 pounds per square inch. Dependent upon individual desires, various color mixtures can be added to the concrete mix. A preferred color utilized by the subject co-inventors is Color No. C1215 manufactured by L. M. Scoffield of Los Angeles, Calif., however, other conventional color mixtures may be substituted.

The concrete mix is preferably screed to the desired level plane of the concrete surface. However, the mix is not tamped as is conventional in the art. The applicants have found that tamping should be avoided so as not to bring up too much cement/fines in the concrete mix which would be prohibitive for the subsequent surface seeding of the exposed aggregate thereupon. Rather, subsequent to screeding, the concrete mix 16 is surfaced with a conventional magnesium bull float. Such magnesium bull floats are known in the art and are characterized by possessing an extremely smooth or polished surface which the applicants have found tends to seal the top surface of the concrete mix 16 and bring up the appropriate amount of cement fines for the subsequent manipulative steps of the present invention.

When the upper surface of the concrete mix 16 is still plastic, small size exposed aggregate 18 is broadcast over the top surface of the concrete mix 16. In the preferred embodiment, the aggregate 18 comprises Monterey Aquarium (Grade) coarse sand characterized by having a mean average diameter size of approximately one-eighth inch diameter which further is characterized by the individual sand grains possessing a rounded external surface configuration. Such small size sand aggregate is a substantial departure over the prior art surface seeded exposed aggregates which typically comprise rock or gravel aggregate having average mean diameters of three-eights of an inch or greater and characterized by rough, jagged exterior surfaces. Typically the sand aggregate 18 is broadcast over the surface of the concrete mix 16 by use of square point shovels and is applied at a rate of approximately one pound per square foot of concrete mix 16 surface. In this regard, the sand aggregate 18 should not initially depress below the top surface of the concrete mix 16 but rather, should be broadcast solely to cover the same.

After broadcasting of the sand aggregate 18 the sand aggregate 18 is mixed or worked into the surface of the concrete mix 16 by use of magnesium hand floats which are preferably manipulated in a circular motion to cover the sand aggregate 18 with the sand cement paste or slurry derived from the concrete mix 16 during the previous magnesium bull float step. This mixing of the sand aggregate 18 with the sand cement paste is critical to the process of the present invention and insures that the sand aggregate 18 is thoroughly adhered or bonded to the top surface of the concrete mix 16 upon resultant curing. As to any areas of the concrete surface which are inadvertenly missed or not covered by the magnesium hand float, a hand sponge may be utilized in a circular motion to fill the same cement paste matrix with the sand aggregate 18 therein.

When the resultant sand aggregate 18 and concrete 16 surface will not depress more than one-eighth of an inch by manual pressing with the finger tips thereupon, a chemical surface retarder is sprayed thereupon to uniformly cover the top surface of the concrete mix. The chemical surface retarded slows down the hydration process of the concrete be penetrating the top surface of the concrete mix to a depth of approximately three-eighths of an inch which, due to the relatively small size of the sand aggregate 18 therein, causes the penetration of the chemical surface retarder to a depth below the maximum depth of the sand aggregate 18. Although various conventional surface retarders may be utilized, the applicants have found that superior results are made possible by use of the chemical surface retarder designated as SPEC AE manufactured by E. L. Moore Co. of Costa Mesa, Calif. After uniform coverage of the surface retarder thereon, the top surface of the concrete mix 16 is covered with a vapor barrier typically comprising four or six mill visqueen, which vapor barrier is maintained thereupon for a period of approximately two to twenty four hours and, preferably four hours. The vapor barrier is subsequently removed and the top surface of the concrete mix 16 is washed with water to remove any surface film therefrom. In this washing procedure it is additionally preferable to light brissel brush the concrete surface wherein preferably no more than five percent of the sand aggregate 18 is dislodged and removed therefrom. The extremely low percentage, i.e. less than five percent, removal of the sand aggregate 18 from the concrete surface evidences the extremely strong bond, i.e. adherence to the sand aggregate 18 to the surface of the concrete which heretofore has not been possible when utilizing such small diameter and rounded exterior exposed aggregate.

Subsequent to washing, the concrete mix 16 is cured with water only as opposed to chemical curing agents to avoid any staining of the same, with such water curing typically being facilitated by use of a conventional fogger or soaker hose. Approximately thirty days after initiating the curing process, any surface residue present on the concrete surface is removed by conventional power washing with a ninety percent steam and ten percent muriatic acid mixture which is applied by a power washer via a high pressure nozzle.

The resultant surface seeded exposed aggregate concrete exhibits an extremely flat exposed aggregate surface which is suitable for extremely high traffic pedestrian flooring applications. In addition, the surface texture and color is such that it approximates the surface color and texture of more conventional flooring surfaces such as stone, granite and marble. This resemblance can be further accentuated by saw cutting the concrete surface into rectangular grids to give the appearance that the individual rectangular squares of the grid were layed in a manner analogous to stone, granite or marble flooring. Thus, the present invention comprises a significant improvement in the art by providing a surface seeded exposed aggregate concrete wherein due to the extremely small diameter size of the exposed aggregate thereon, possesses a surface texture and color having improved asthetics over the prior art.

Although for purposes of explanation certain material specifications have been disclosed herein, those skilled in the art will recognized that various modifications of the same can be made without departing from the spirit of the present invention, and such modifications are clearly contemplated herein.

What is claimed is:

1. A method of producing surface seeded exposed aggregate concrete having a generally flat exposed aggregate surface suitable for flooring applications comprising the steps of:
    preparing the subgrade to a desired grade;
    pouring a concrete mixture over said subgrade;
    screeding said concrete mixture to a desired grade;
    finishing the upper surface of said concrete mixture with a magnesium bull float to seal said upper surface and dispose a quantity of cement/fines paste derived from said concrete mixture at said upper surface of said concrete mixture;
    broadcasting a quantity of aggregate having a mean diameter size of less than three-eights of one inch upon said upper surface of said concrete mixture;
    mixing said quantity of aggregate into said quantity of cement/fines paste with a magnesium hand float;
    applying a surface retarder uniformly over said upper surface of said concrete mixture;
    washing surface films from said upper surface of said concrete mixture;
    curing said concrete mixture; and
    washing said upper surface of said concrete mixture to remove surface residue therefrom.

2. The method of claim 1 wherein said applying of said surface retarder causes penetration of said surface retarder into said upper surface of said concrete mixture through a distance greater than the mean diameter of said aggregate.

3. The method of claim 2 wherein said aggregate comprises coarse sand.

4. The method of claim 3 wherein said aggregate comprises Monterey Aquarium coarse sand.

5. The method of claim 4 wherein said Monterey Aquarium coarse sand is broadcast over the upper surface of said concrete mixture at an approximate rate of one pound per square foot of concrete mixture.

6. The method of claim 4 wherein said mixing step comprises using a magnesium hand float in a circular motion to cover said aggregate with said cement/fines paste.

7. The method of claim 6 wherein between said mixing and said applying said surface retarder steps, said method comprises the further step of:
    sponging in a circular motion any areas of said upper surface of said concrete mixture.

8. The method of claim 7 wherein said washing of surface film comprises the steps of applying water to said upper surface of said concrete mixture and lightly brushing said upper surface of said concrete mixture.

9. The method of claim 8 wherein said lightly brushing step removes no more than five percent of said aggregate from said upper surface of said concrete mixture.

10. The method of claim 9 wherein between said applying of said surface retarder and said washing surface film step said method comprises the further step of covering said upper surface of said concrete mixture with a vapor barrier.

11. The method of claim 10 wherein said washing of said upper surface of said concrete mixture to remove surface residue therefrom comprises washing said upper surface of said concrete with a mixture of water and muriatic acid.

12. The method of claim 10 wherein said covering said upper surface of said concrete mixture with a vapor barrier extends for a period of three to twenty-four hours.

13. The method of claim 12 wherein said curing step comprises curing said concrete mixture by use of a fogger.

14. The method of claim 13 wherein said curing step comprises curing said concrete mixture by use of a soaker hose.

15. The method of claim 12 wherein said preparing of the subgrade comprises compacting the subgrade to approximately ninety percent compaction.

16. The method of claim 15 wherein said preparing of the subgrade further comprises the step of placing a layer of sand between said subgrade and said poured concrete mixture.

17. The method of claim 16 comprising the further step of placing reinforcement means upon said prepared subgrade to be disposed within said poured concrete mixture.

18. The method of claim 17 wherein said pouring step comprises the further step of mixing said concrete mixture with a color additive.

19. A surface seeded exposed aggregate concrete product formed by the method of claim 18.

* * * * *